April 22, 1941.  F. R. McMURRAY ET AL  2,239,651
SERVICE SADDLE
Filed Nov. 21, 1938
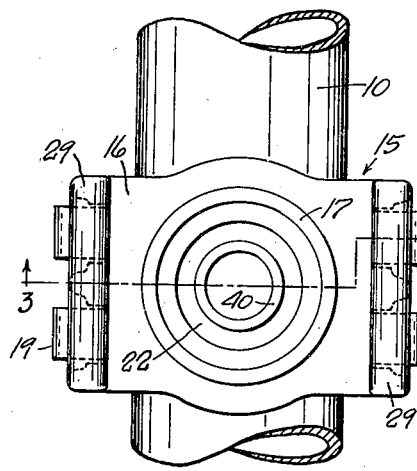
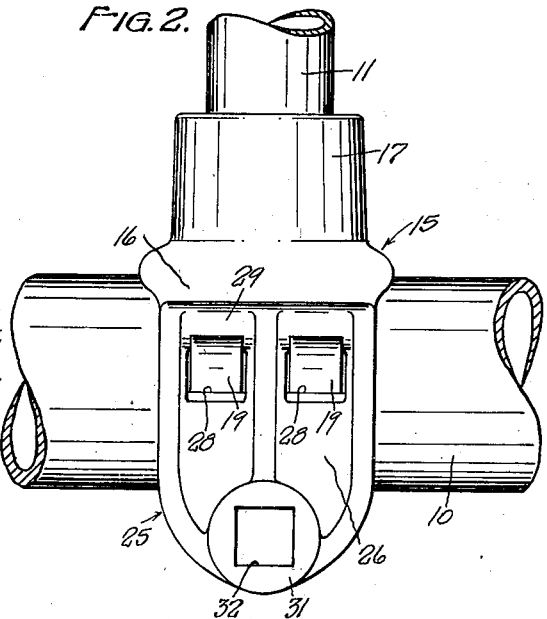
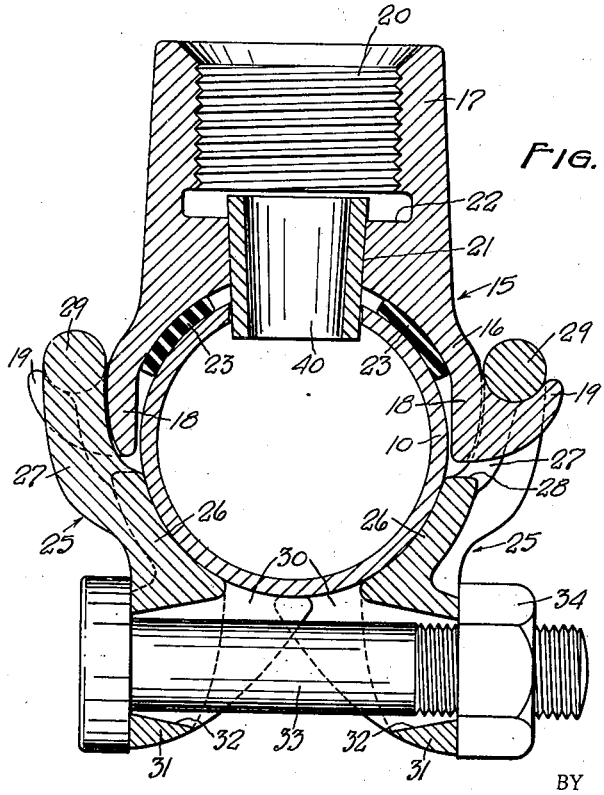
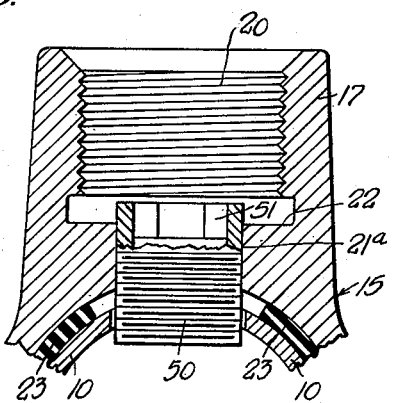
FREDERICK R. McMURRAY.
PATTERSON D. MERRILL.
INVENTOR.
BY Oltech & Knoblock
ATTORNEYS.

Patented Apr. 22, 1941

2,239,651

UNITED STATES PATENT OFFICE 2,239,651

SERVICE SADDLE

Frederick R. McMurray and Patterson D. Merrill, South Bend, Ind., assignors to M. B. Skinner Company, South Bend, Ind., a corporation of Indiana Application November 21, 1938, Serial No. 241,494

4 Claims. (Cl. 285—108)

This invention relates to improvements in service saddles, and particularly to a device for making service connections on supply pipes containing gas, oil, water or other fluid.

Heretofore, devices of this character have commonly been made in two complementary arcuate rigid sections, pivotally connected together at one end, with a draw bolt between the opposite ends to tighten the unit on the pipe. A projecting boss was formed on one arcuate section and provided with a threaded passage therethrough. A gasket or sealing ring carried by the inner periphery of said bossed section encircled the inner end of said passage to effect a seal when the pipe encircled by the saddle was tapped in alignment with said passage for supplying fluid to a service connection pipe threaded in said boss passage. In practice, this type of device has been found to have certain operating deficiencies and disadvantages. One of these deficiencies is the absence of means to prevent the saddle from turning on the pipe, with resultant failure of the device. This is frequently encountered when the forces of expansion and contraction incident to freezing of the ground around a pipe tend to displace one pipe relative to the other, as between the main and the service connection branch. Another disadvantage of this type of device has been that the force of the draw bolt is principally exerted adjacent thereto, while little force is exerted diametrically opposite thereto adjacent the pivot connection of the parts, with the result that the sealing ring is not uniformly compressed to obtain a uniform sealing action throughout its circumference.

The primary objects of this invention is to overcome the above and other deficiencies and disadvantages of the device as heretofore conventional.

A further object is to provide a three part device, having a pair of drawing sections each pivoted to an end of a connector section, whereby the pull of a draw bolt connecting the free ends of the drawing sections is transmitted equally to both ends of the connector section.

A further object is to provide means for keying the device to the pipe encircled thereby to prevent slipping or skidding of the device relative to said pipe.

Other objects will be apparent from the description and appended claims.

Fig. 1 is a top plan view of the device.

Fig. 2 is a view of the device in side elevation.

Fig. 3 is a cross-sectional view taken on line 3—3 of Fig. 1.

Fig. 4 is a fragmentary sectional view similar to Fig. 3, and illustrating a modified embodiment of the invention.

Referring to the drawing, which illustrates the preferred embodiment of the invention, the numeral 10 designates a service pipe with which a connection is to be made to supply contents of said pipe to a connector or branch pipe 11.

The saddle comprises three castings preferably formed of malleable metal, and each of generally arcuate form. One part, referred to as a connector 15, comprises a curved inner or plate portion 16 substantially semicircular in extent from whose center projects an integral boss 17. At opposite sides of plate portion 16 extend substantially parallel portions 18 each preferably provided with a pair of spaced outwardly projecting hooks 19. A passage extends centrally through connector 15 axially of boss 17, and comprises an outer threaded portion 20 and an inner portion 21 which is of smaller diameter than portion 20 and tapers inwardly, thus providing an intermediate shoulder 22 in said passage. The inner face of plate portion 16 has a sealing ring 23 which may be formed of lead, rubber, artificial rubber or any other suitable material, said ring being concentric with passage 21 and preferably of a size to form a solid seat on pipe 10 to prevent tilting, and with its inner periphery of greater diameter than passage 21.

The other two parts of the saddle are complementary and are referred to herein as draw portions 25. These comprise an arcuate body portion 26 each having outwardly off-set ribbed portions 27 provided with a pair of apertures 28 whose outer sides are defined by transverse portions 29 of circular cross-section. The bottom portions of draw parts 25 are provided with toothed projecting parts 30 so positioned as to interfit as best shown in Fig. 3 so that each will project slightly beyond the axis of bore 21 projected thereto. An ear 31 projects from the lower end of each draw part 25 in outwardly spaced relation to toothed projections 30 which merge therewith. Each ear is provided with an outwardly tapering bore 32 centrally thereof. A suitable draw bolt 33 extends through bores 32 and is provided with a nut 34.

In use draw parts 25 are connected to the opposite sides of connector part 15 by passing hook portions 19 of the latter through openings 28 to obtain a pivotal hooked engagement with transverse portions 29 of the former. The parts, so assembled, are positioned astride the pipe 10, and the ears 31 of draw parts 25 are interconnected by bolt 33 and are drawn together by tightening nut 34. As the lower ends of draw parts 25 are so drawn together, the device is tightened upon pipe 10 to grip or clamp said pipes. Each of the parts 25 exerts an equal pull on the opposite sides of connector part 15 applied thereto by hooks 19. This pull is facilitated by interfitting teeth 30 which ride upon the pipe to obtain a sliding tightening action of parts 25, reinforce parts 25, and tend to equalize the stress applied to pipe 10 throughout its circumference. By this action, sealing ring 23 is compressed uniformly throughout its circumference and provides an effective seal. A hole is then drilled in pipe 10 in concentric relation to passage 21. A tapered sleeve 40, which fits tightly in inner passage portion 21 is then driven solidly into said passage portion. The sleeve 40 is so shaped and proportioned that its inner end projects through the hole in pipe 10, and its outer end projects slightly above shoulder 22. Branch pipe 11 is then threaded in outer passage portion 20.

It will be seen that sleeve 40 constitutes a key which positively prevents rotation or sliding of the saddle on pipe 10. Consequently the saddle cannot fail by reason of shifting of parts relative to each other. The application and tightening of the device is simple by virtue of the hooked interconnection of parts for application, and of the use of a single draw bolt. The life of the sealing ring 23 is enhanced by virtue of its uniform compression, and because compression thereof can be limited to minimum operative extent much below that which frictional clamping engagement, instead of keying, would require to hold the device from slipping.

The embodiment illustrated in Fig. 4 uses an externally screw threaded tube 50 threaded in bore 21a and projecting through the hole in the pipe, as a key to prevent rotation or sliding of the saddle on the pipe. In order to apply the tube, the same is provided with an internal socket 51 for a suitable tool for rotating said sleeve.

We claim:

1. A service saddle comprising an intermediate rigid member having an arcuate inner face, a gasket carried by the inner face of said member, an outwardly projecting rigid hook carried by each end of said member, a pair of complementary rigid draw parts each having an arcuate inner face and a rigid off-set portion terminating in a cylindrical head and having an opening therethrough defined in part by said head, said hooks passing through said openings for pivotal engagement with said head, and means for drawing the free ends of said draw parts together said cylindrical heads being spaced apart a distance greater than the diameter of the curvature of said faces and being disposed at an angle of substantially 180 degrees with reference to the axis of the inner face of said intermediate member.

2. A service saddle for a pipe having an opening therein, comprising a ring formed of three rigid parts having arcuate inner faces, the intermediate part having a central opening therethrough adapted for alignment with said pipe opening, a gasket ring carried by the inner face of said intermediate part and substantially concentrically encircling said opening, a pair of means spaced apart a distance greater than the diameter of said pipe for pivotally connecting said parts, the axis of said pivot means being angularly disposed substantially 180 degrees with respect to the pipe axis, and a single means for drawing the free ends of the outer parts together to apply equal force to the ends of said intermediate part and thereby uniformly compress said gasket.

3. A service saddle as defined in claim 2, wherein each pivot means comprises an outwardly projecting hook on one part and an off-set end portion on the other part having an opening receiving said hook.

4. A service saddle as defined in claim 2, wherein said outer members have pipe-engaging projections arranged in inter-digital relation adjacent said tightening means to hold said members in operative relation and afford continuous pipe engagement between the inner pivoted ends of said outer members.

FREDERICK R. McMURRAY.
PATTERSON D. MERRILL.